United States Patent
Borer et al.

(10) Patent No.: US 6,852,256 B2
(45) Date of Patent: Feb. 8, 2005

(54) PROCESS FOR UPGRADING PLASTIC MATERIAL

(75) Inventors: Camille Borer, Flurlingen (CH); Brent Allen Culbert, Wil (CH)

(73) Assignee: Buhler AG, Uzwil (CH)

( * ) Notice: Subject to any disclaimer, the term of this patent is extended or adjusted under 35 U.S.C. 154(b) by 272 days.

(21) Appl. No.: 09/878,345

(22) Filed: Jun. 12, 2001

(65) Prior Publication Data

US 2002/0036361 A1 Mar. 28, 2002

Related U.S. Application Data

(63) Continuation-in-part of application No. 09/244,630, filed on Feb. 4, 1999, now abandoned.

(51) Int. Cl.[7] .............................................. B29C 47/92
(52) U.S. Cl. .................... 264/40.6; 264/85; 264/143; 264/236; 264/347; 264/920; 521/48
(58) Field of Search ...................... 264/40.6, 85, 37.14, 264/37.17, 143, 211.2, 235, 236, 918, 920, 346, 347; 521/48

(56) References Cited

U.S. PATENT DOCUMENTS

| | | |
|---|---|---|
| 3,344,091 A | 9/1967 | Russin et al. |
| 3,756,990 A | 9/1973 | Jaeger et al. |
| 4,064,112 A | 12/1977 | Rothe et al. |
| 4,154,920 A | 5/1979 | Jabarin |
| 4,165,420 A | 8/1979 | Rinehart |
| 4,238,593 A | 12/1980 | Duh |
| 5,091,134 A | 2/1992 | Oshima et al. |
| 5,119,570 A | 6/1992 | Rüssemeyer et al. |
| 5,225,130 A | 7/1993 | Deiringer |
| 5,449,701 A | 9/1995 | Duh |
| 5,473,102 A | 12/1995 | Johnson et al. |
| 5,554,657 A | 9/1996 | Brownscombe et al. |
| 5,587,186 A | 12/1996 | Voigt |
| 5,590,479 A | 1/1997 | Ruf et al. |
| 5,708,124 A | 1/1998 | Al Ghatta et al. |
| 5,876,644 A | 3/1999 | Nichols et al. |
| 5,945,460 A | 8/1999 | Ekart et al. |

FOREIGN PATENT DOCUMENTS

| | | |
|---|---|---|
| DE | 43 26 106 A1 | 2/1994 |
| DE | 198 54 689.0 | 11/1998 |
| WO | WO 98/40194 | 9/1998 |

*Primary Examiner*—Mark Eashoo
(74) *Attorney, Agent, or Firm*—Burns, Doane, Swecker & Mathis, L.L.P.

(57) ABSTRACT

In a process for upgrading cleaned used plastic material to be reclaimed, all steps are performed in a continuous way so as to extrude continuously the plastic material to provide elongated strands thereof, cutting the strands continuously as they are supplied by extrusion to convert them into pellets. Then, the pellets are fed without any intermediate storage to a continuous crystallizer in a stream of hot gas to heat the pellets to crystallizing temperature.

13 Claims, 3 Drawing Sheets

PROCESS FOR UPGRADING PLASTIC MATERIAL

CROSS REFERENCE TO RELATED APPLICATION

This application is a continuation-in-part of application Ser. No. 09/244,630, filed Feb. 4, 1999 (now abandoned), which is incorporated herein in its entirety.

FIELD OF THE INVENTION

This invention relates to process of reclaiming and upgrading cleaned used, i.e., non-virgin plastic material, particularly polyester material, such as polyethylene terephthalate. More particularly, the invention relates to process where used plastic material, and particularly polyethylene terephthalate, is upgraded to bottle grade material. When reclaiming, cleaning may be done before or within the framework of the present process. More specifically, the present invention relates to a process for upgrading cleaned used plastic material to be reclaimed comprising the steps of continuously extruding used plastic material to provide elongated strands, continuously cutting the strands to convert them into pellets, and feeding said pellets to a crystallizer.

BACKGROUND OF THE INVENTION

U.S. Pat. No. 5,225,130 or WO 98/40194 disclose such a process. Typically, this known process, particularly that of the WO document, provides melting and cutting the cleaned and sorted plastic material which steps can be done in an extruder followed by and cooperating with an extruder. Extruding is a typical continuous step. After this continuous step, however, both documents suggest crystallizing and condensing the material in a tumbler or similar device under vacuum in solid state.

This known process has a series of disadvantages. It is known that tumblers are often provided with a vacuuming facility so that such tumblers are the obvious device for carrying out the process. However, good sealing is a precondition, because any vacuum draws air from the environment in, especially if the seal used becomes worn out or damaged. In such a case, oxygen from air can affect the quality of the reclaimed end product.

Moreover, tumblers can only be operated in batches. This leads to the necessity of an intermediate storage facility which involves additional investment costs and the requirement of additional space. Furthermore, the production capacity of tumblers and like devices operating in batches is very limited so as to inhibit reclaiming large quantities of plastic material. Since, however, plastic material, such as PET, is increasingly in use, there is a necessity of reclaiming large quantities which cannot be done with the existing batch equipment. All these drawbacks, i.e., intermediate storage and relative small quantities handled at a necessarily high investment, result, in addition, in relative high reclaiming costs.

A further problem with PET or other plastic material to be recycled is that it may be contaminated by some chemicals which migrated in it during the former use. A typical example of such chemicals are aromatic compounds or flavors which stem from beverages or other liquids in those bottles. Another example are acids, soaps, and the like which contaminated the PET material after ordinary use. Adherents from labels have also to be removed. The prior art paid little or no attention to these factors which are relevant when it is intended that the reclaimed material should have bottle grade quality.

In this connection, reference should also be made to German patent publication No. 198 54 689, the contents of which being incorporated herein.

Several technologies are known to increase the gas barrier properties of PET packages such as bottles to reduce the ingress of oxygen or also to improve the retention of beverage carbonation. A polymer with higher gas barrier properties (e.g. PEN) or a filler which will increase the length of the diffusion path (inorganic platelets) or a substance that will react with ingressing oxygen (oxygen scavengers) might be added to the PET. This PET can now be used as a mono-material or as a layer of a multi-layer structure to manufacture the PET package. The introduction of the gas barrier increasing additive into the PET can be achieved either by producing a masterbatch, which represents an additional processing step or by direct introduction into the manufacturing process of the PET package, which adds to the complexity of the manufacturing process and requires investment in all manufacturing equipment where the additive has to be used.

SUMMARY OF THE INVENTION

Therefore, it is an object of the present invention to devise an improved process of the kind described which leads to a higher yield being capable of reclaiming large quantities of used non-virgin plastic material.

It is another object of the invention to reduce investment costs and the expenses of operation in a process of the kind described, particularly by avoiding the necessity of intermediate storage.

It is a further object of the present invention to find a process enabling to produce a better quality of reclaimed plastic material.

These objects are substantially achieved by using continuous treatment steps throughout the whole process and, more particularly, continuously crystallizing the pellets, as they are fed after cutting, in a stream of hot gas to heat the pellets to crystallizing temperature, and finally solid state condensing these pellets.

When using a continuous fluidized bed, which is preferred according to the invention, it is most favorable if this fluidized bed has a plunger characteristic which means that all the pellets are treated during a substantially uniform period of dwell within the fluidized bed. A previous whirling bed, as in the prior art, can be omitted, although the present invention does not prevent using it depending on the stickiness of the product.

It is most favorable if fluidization or other treatment is done in an atmosphere of an inert gas, such as nitrogen, so as to avoid penetration of air or oxygen into the equipment, because the pressure of the inert gas will prevent it. In this way, not only the object of reducing costs and treating large quantities of plastic material is attained, but also a higher quality of the end product.

Preferably, after continuously extruding said plastic material, the rheological properties of the plastic melt are measured and converted to an intrinsic viscosity value. The conditions governing the solid state condensing step are then controlled according to the difference between the measured and the desired intrinsic viscosity values. The temperature in the solid state condensing step may be controlled as well and the residence time is held substantially constant.

According to a further preferred embodiment a gas barrier enhancing additive is added during the extrusion of the used plastic pellets which additive may be either of the type of a scavenging additive or of the type of a gas permeation restricting additive. It is much more convenient and cost effective to introduce the additive in the pelletizing step of the recycling process.

Advantageously, the crystallization in the crystallizer prior to the solid state post condensation of the pellets is carried out to a degree of crystallization of less than 50%, preferably less than 45%. Thus, additional crystallization heat (latent heat of solidification) will become available during the post condensation and compensate for heat losses. As a result, the product can be treated with very little amounts of gas flowing through the product and with a temperature profile as constant as possible.

BRIEF DESCRIPTION OF THE DRAWINGS

Further details, characteristics and advantages will become apparent from the following description of a preferred example according to the invention schematically illustrated in the drawings in which.

DETAILED DESCRIPTION OF THE INVENTION

Figure 1:
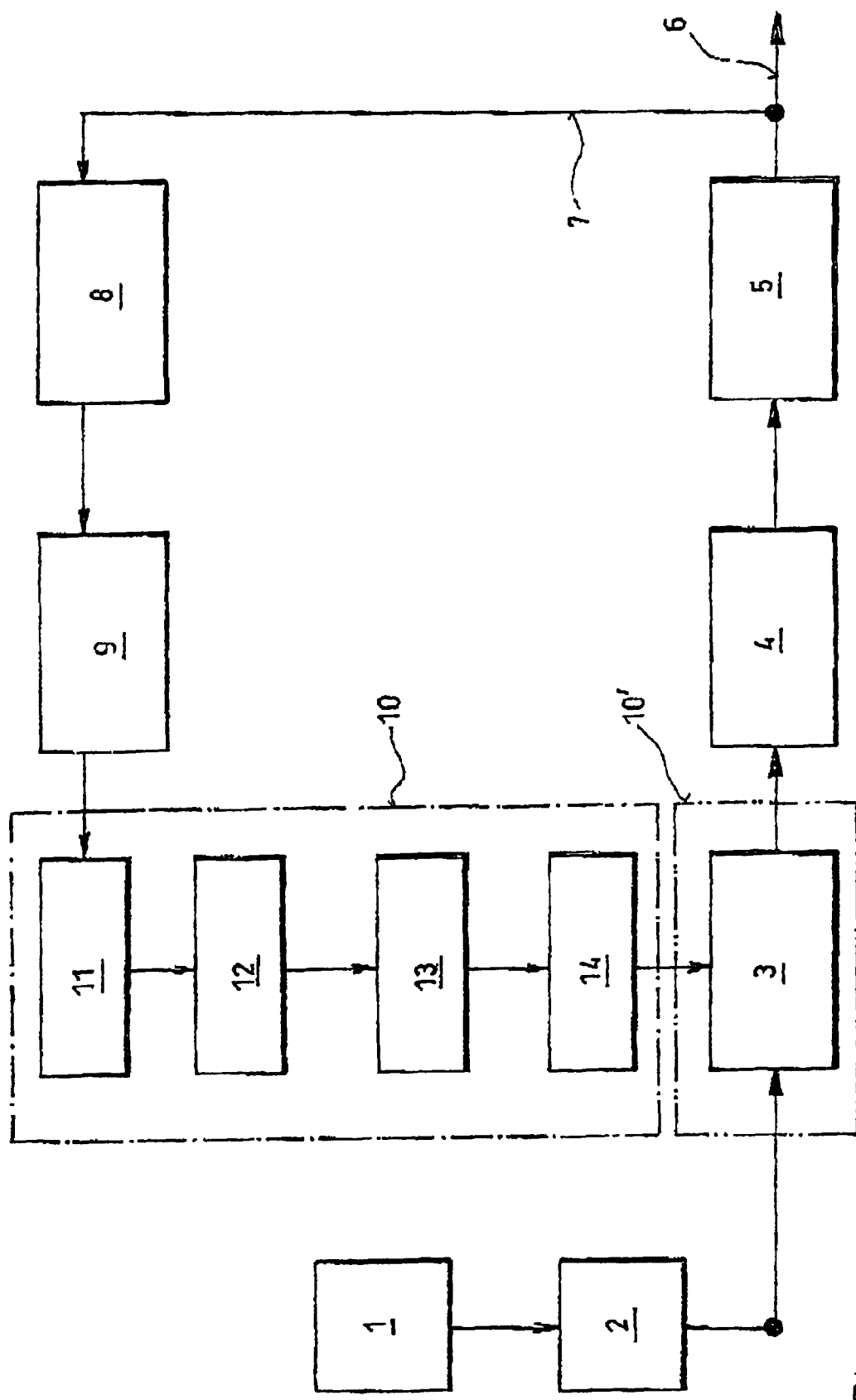
FIG. 1 shows the cycle of PET bottle material.

According to FIG. 1, PET is produced in melting and pellet forming step 1 (normally an extrusion step) after which the material is precrystallized in a step 2, preferably in a manner as described in U.S. Pat. Nos. 5,091,134 or 5,119,570, i.e., in a whirling fluidized bed where the pellet's surface is dried as much as to avoid agglomerating and sticking of individual pellets in the following step. Step 2 is followed by a continuous after-crystallizing or main crystallizing step 3 in which, according to U.S. Pat. Nos. 5,091,134 or 5,119,570, the pellets are fed with a plunger characteristic, i.e., a characteristic by which each particle has the same period of dwell in the fluidized bed and, therefore, is uniformly treated.

After crystallizing in step 3, the PET material is polycondensed in a step 4 in a manner known per se and bottles are formed, normally by blow molding. The thus formed bottles are sold in step 5 to individual consumers after which they are either discarded (arrow 6) or are reclaimed (arrow 7).

For reclaiming, a collection system 8 is needed after which the collected material has to be washed, sorted and cleaned (step 9). Then begins the real reclaiming process 10 which can comprise a drying step 11 (sometimes necessary after the cleaning step 9 depending on the moisture of the material), and a melting and extrusion step 12 (which can be done in a single machine or extruder that melts the material first, and then extrudes at least one strand). It should be noted, however, that drying could also be done in the extrusion step in accordance with German Pat. Application No. 198 54 689.0, filed Nov. 26, 1998 (Inventors: Messrs. Goedicke and Innerebner), the contents of which being incorporated here by reference.

It is convenient to provide a filtering step 13 either in combination with the extruding step (at the end of it, before extruding the strand) or as a separate step so as to remove impurities.

The extruded strand(s) are then cut to pieces or pellets in step 14. Since the material was in molten (-amorphous) condition, it is necessary to recrystallize it. Therefore, the pellets could again be fed through the precrystallizing step 2 and the crystallizing step 3, but it has been found, according to the invention, that it is sufficient to use the fluidized bed 3 having a plunger characteristic, thus shortening and economizing the process. Thus, it will be understood that step 3 may have a double function, i.e., one in the first production of the bottle raw material and then as a part of the reclaiming process 10 for which reason this step 3 is enveloped by a dot-dotted line 10'. This does not necessarily mean that recycling of the material is done in the same apparatus as initial production but, in fact, this can happen.

It has been suggested in the prior art to mix the reclaimed material with fresh plastic material by melting them together. Although this can be done also when performing the process according to the present invention, it is preferred to blend the materials in the crystallizing step 3 where fresh material from step 2 can be added to reclaimed material from step 14. However, this is not critical, and it would also be possible to have a separate mixing step, e.g., before (re) condensing the material in step 4. Recondensing of reclaimed material is preferably done without any significant raise or change in intrinsic viscosity of the pellets as compared with that of the material before extrusion step 12 (FIG. 1). This means that extrusion will normally diminish the intrinsic viscosity value which is afterwards suitably raised to the range the material had before. The exact value, however, is not critical.

Figure 2:
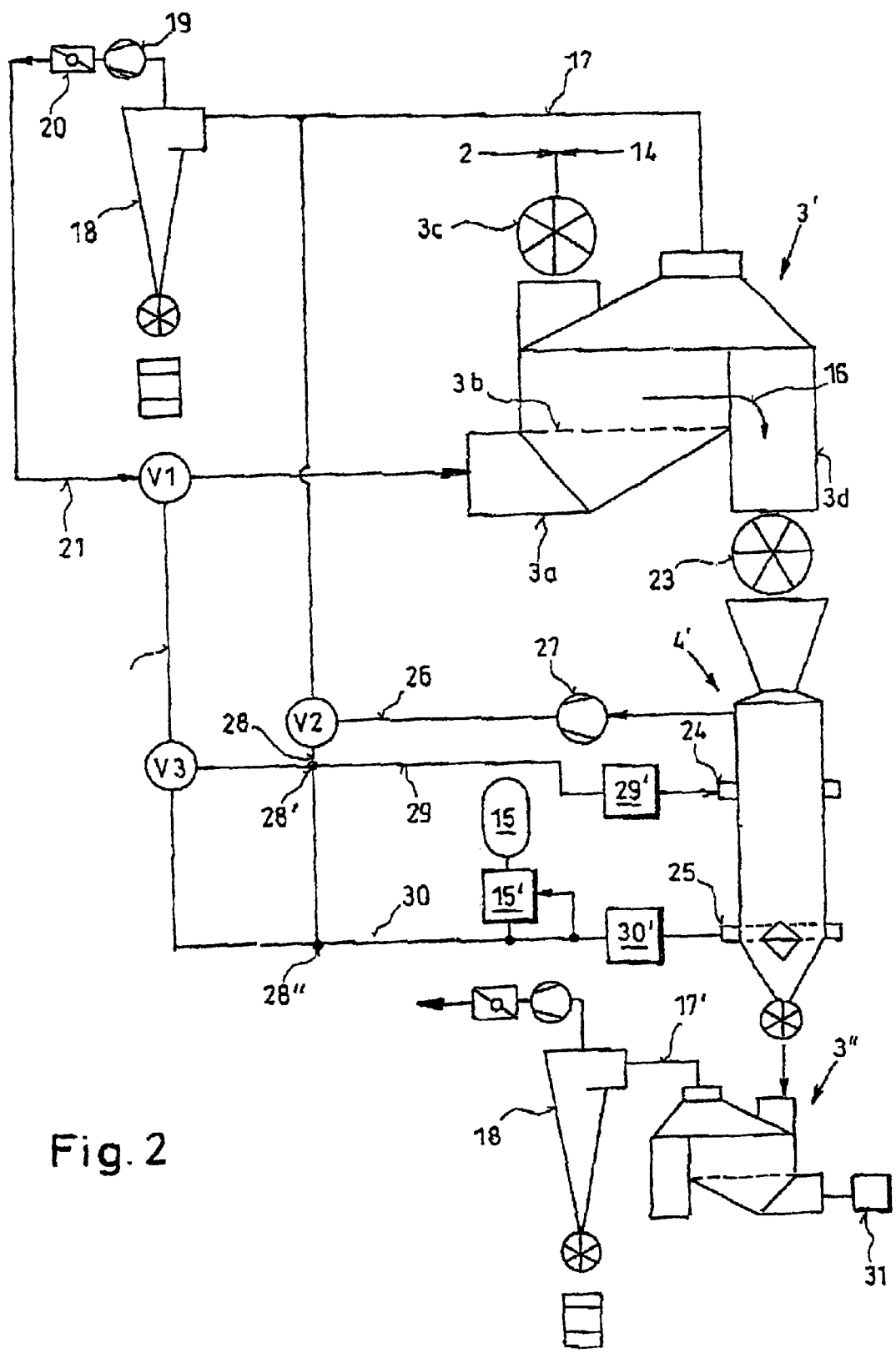
FIG. 2 illustrates the process according to the invention as a detail of the cycle of FIG. 1.

FIG. 2 illustrates steps 2 and 14, 3 and 4 according to a particularly preferred example. The crystallizer 3 of FIG. 1 is formed as a fluidized bed 3' where an inert gas, such as nitrogen from a source 15 of nitrogen, is fed through a supply/heater conduit 3a and through a perforated bottom 3b while, concurrently, pellets either from cutting step 14 (FIG. 1) and/or from the precrystallizing step 2 are fed into the fluidized bed 3' via a rotary valve 3c. This bulk of pellets move substantially at uniform speed (plunger characteristic) through the fluidized bed 3' in the direction of arrow 16.

Gas that has entered the fluidized bed 3' via conduit 3a leaves the fluidized bed 3' at the top and via a conduit 17 leading to a cyclone 18 (or other separator, such as a filter) from which it is pumped off via a pump or fan 19. The suction power of fan 19 can be regulated by a flap (or any) valve 20. From this valve 20, a conduit 21 recycles the gas, which may have a temperature in a range of 180° C. to 225° C., e.g., 205° C., to the supply/heater conduit 3a via a three-way valve VI which can divert part of the gas stream into a conduit 22. It will be clear that conduits 17, 21 form a cycle for its own so that it would be possible to have a separate source of nitrogen for it, although it is preferred within the scope of this invention to have a common source 15 of inert gas both for the circuit 17, 21 and a further circuit to be described below. It should be noted that it is convenient to have a pressure stabilizing valve 15' assigned to this source of inert gas 15. It is clear that any inert gas common in plastic production can be used.

Having moved in the sense of arrow 16 towards an outlet channel 3d of crystallizer 3', the pellets are discharged via a further rotary valve 23 into a heater/reactor 4'. In order to enable counter-current flow of gas from the reactor 4', it may be desirable to omit the rotary valve 23 entirely. In the reactor 4', the pellets are heated up to a higher temperature than in the crystallizer 3' in order to provoke reaction (condensation) of the material. This higher temperature is ordinarily above 180° C., as known per se. However, since the material supplied stems, at least in part, from the reclaiming process 10 (FIG. 1), it is preferred to conduct the process in a way that there is substantially no increase in iv (intrinsic viscosity) of the material as compared with that of the material before the extrusion step at 12. This means that temperatures will be maintained near the initiating point (around 185° C.) of the reaction and/or the gas stream through the reactor 4' is adjusted in an appropriate way so as to avoid further increase of iv as compared with that of the material before the extrusion step 12 (FIG. 1).

It has been said that 4' designates a heater/reactor. In fact, the purpose of this apparatus is two-fold by first preheating the pellets up to a temperature at least near the reaction (condensation) temperature so as to bring the materials temperature gently up to reaction. It has already been suggested to raise the temperature in at least two steps (cf. U.S. Pat. No. 3,756,990). Therefore, it can be useful, although using a single apparatus for both steps to divide the heater/reactor 4' into two parts by introducing a heating gas at an upper annular conduit 24 communicating with the interior of the reactor 4' and a lower, similar annular conduit 25 in order to adapt gas velocity and/or quantity to the special purpose. It should, however, be noted that this will not be necessary in any case, and for some cases it would be sufficient to have a single supply over the annular conduit 25 only.

Reaction occurring internally in the material is an exothermic one. Therefore, one would suppose that the gas supplied has some cooling function and has, therefore, to be kept at a low temperature. However, what really happens within the reactor is that the internal reaction is slowed down as soon as a cloud of reaction gas surrounds every particle. Therefore, it can be the case that the reaction is accelerated and material becomes hot when too much "cooling" gas is introduced. This can result in partial melting at the top of the reactor 4' and, to counteract, it may be useful to slow down the flow of pellets in a downward direction. This can be done by braking inserts in the hollow space of the reactor 4', e.g., by providing roof-like traversing beams.

Likewise, whether the annular conduit 24 and 25 or only one is used, the gas will escape at the top, i.e., it streams as a counter-current to the downward directed flow of pellets. At the top, there is at least one exhaust conduit 26, possibly containing a pump or fan 27. Alternatively, separate exhaust conduits are provided and assigned each to the annular conduit 24 or 25, respectively. In exhaust conduit 26, there is again a three-way valve V2 which selectively leads the stream of exhaust gas to line 17 and into the separator cyclone 18 or in a cycle to a recycling conduit 28. This recycling conduit 28 may either lead through a conduit 29 to conduit 24 and/or through a conduit 30 to conduit 25. In both conduits (or one of them) a heater 29' or 30' may be provided to establish and ensure the desired temperature, which may reach 185 to 220° C., and will normally be at about 200° C. For using alternatively one of the conduits, it may be convenient to provide respective valves at the junctions 28' or 28" in order to regulate and direct the stream of gas properly. Furthermore, if the cycle of reactor 4' is closed over conduits 26, 28, 29 and/or 30, it will be suitable to provide another separator, similar to separator 18, just after the valve V2. Therefore, it will be apparent to those skilled in the art that it is more favorable to combine the two circuits of apparatus 3' and 4' by allowing gas to flow from conduit 26 to 17, to separator 18 and back over conduit 21 and valve V1 partially back into the crystallizer 3', partially into conduit 22 to supply gas to annular conduit 25 and, if necessary, to conduit 24 over an appropriate further valve V3.

The temperature profile along the length of the heater/reactor 4' is first increasing, then substantially maintained at a desired level and is suitably sharply lowered at the bottom end in order to obtain a temperature significantly below the reaction temperature, such as at 160° C. This is not necessary, but avoids the use of nitrogen (to prevent oxidizing) in a following cooler 3". As is shown in FIG. 2, this cooler can be formed by a fluidized bed 3" just identical in structure as the crystallizer 3'. The difference may be only that it can have a blower 31 sucking air from the environment instead of nitrogen, if the temperature at the end of reactor 4' is significantly lowered, as explained above. Therefore, the cooler 3" can have its own conduit 17' leading to separator 18'. If, however, the temperature is still in the range of the reaction temperature (at least 180° C.), the circuit of the cooler 3" could be combined with the above-mentioned circuits of apparatus 3' and 4'.

Figure 3:
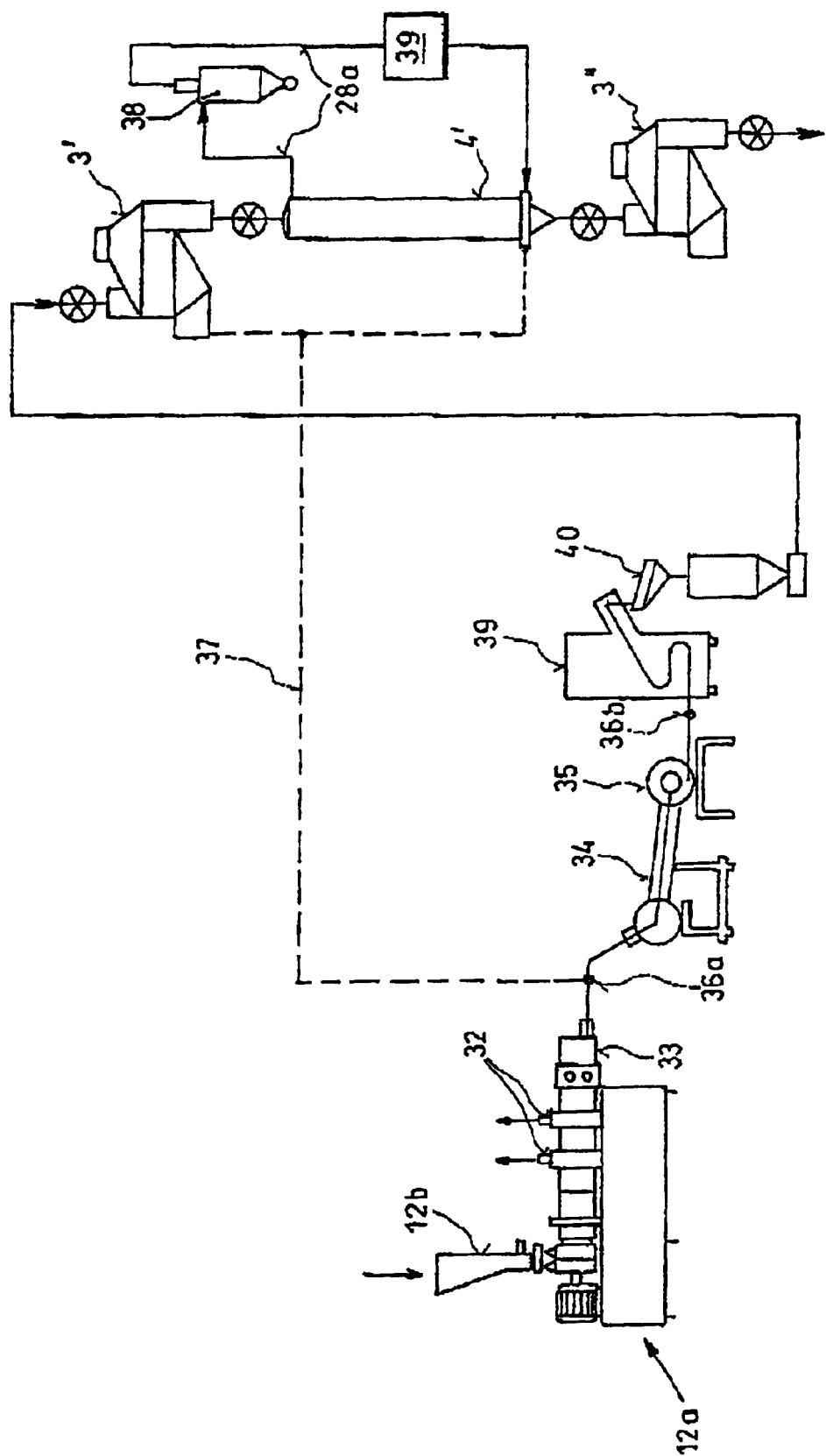
FIG. 3 represents a practical example of an installation for recycling and decontaminating recycled PET material.

FIG. 3 shows an extruder 12a having a hopper 12b into which flakes of PET material are filled. The flakes were previously subjected to the above-mentioned steps 8, 9 and 11. During melting in the extruder 12a, gases of contaminating substances will develop and are suitably sucked off via at least one or more vacuum channels 32. The extruder 12a may be of any type known in the art. However, it is preferred to have an extruder with at least two screws, and it is even more preferred to have a plurality of screws arranged in an annular configuration when seen in cross-section.

When the plastic material leaves the extruder 12a, it is either cut into pellets immediately in the moment of passing a die by an appropriate granulator known in the art or, as may be seen in FIG. 3, after cooling in a liquid in a strand cooler 34, a cutter 35 being provided at the end of it. It should be understood that the present invention is not restricted to a special type of producing pellets.

The examples given below show how different the quality of the raw material can be. Nevertheless, a uniform bottle grade quality should be attained at the end of the process. Therefore, it is advantageous to monitor the quality (preferably the intrinsic viscosity) at a point 36a or 36b, or even within the extruder 12a, by by-passing part of the molten material and analyzing the by-passed amount. A vast number of methods and apparatuses are known for determining the viscosity of a material and can be used in the present process. For example, the viscosity may be determined by a NIR apparatus, as suggested at the end of a crystallizer in DE-A-43 26 105, in order to control the, particularly thermal, conditions in the subsequent steps (as indicated by dotted line 37 in FIG. 3). Other possibilities are given by using an ultrasound detector or one of the known viscometers, such as a rotating viscometer or an on-line viscometer. Although DE-A-43 26 105 suggests already the use of a NIR viscometer, it has been found that, for the purposes of reclaiming plastic material, it is useful to arrange such a viscometer 36a or 36b in a range before the crystallizer 3'.

After the possible measuring point 36b, the mixture of pellets and cooling liquid is conveniently transferred along an about S-shaped path schematically illustrated into a separator 39 where the liquid is separated from the pellets (thus mechanically drying the surface of the pellets). Afterwards, the pellets are suitably fed to a sieve 40 to leave the pellets through (being fed to the crystallizer 3'), but to retain agglomerates of them which stick together.

A further possibility of decontaminating the reclaimed material is using the gas circulation through at least one of the apparatuses 3', 3" or 4' which follow the extruder/cutter unit. In FIG. 3, the gas circulation in a circuit 28a through the polycondensation reactor 4' is used by separating contaminating fines in a separator 38 (which is shown as a cyclone, but may be formed by a filter or a combination of both) and an adsorption bed 39, or a similar chemical purification apparatus. Thus volatiles and/or fines are sucked off either through the channels 32 or through the gas circuit 28a or both.

It is clear that a number of modifications are possible within the scope of the present invention. For example, the type of cooler can be changed using a solid bed cooler or a belt cooler. It will also be clear that whether or not all the steps indicated in FIG. 1 are done by a single producer or in different factories, it is only decisive to combine the continuous extrusion and cutting (granulating) step 12 with a continuous crystallizing step, preferably in an inert gas atmosphere, such as a nitrogen atmosphere, in order to avoid all the drawbacks inherent in the prior art processes. Preferably a continuous solid state heating/condensing step is carried out subsequently.

EXAMPLES 1–3

The benefits of the present invention will be better understood from the following examples. In the following Tables 1 and 2, the results of three tests are described where different amounts of plastic material were treated with an average throughput of about 50 kgs/hour. The first analyses according to Table 1 were made after extruding the material, while the results of Table 2 correspond to laboratory tests after crystallization and Solid State Polycondensation (SSP).

TABLE 1

| Example No. | Total quantity/ product kgs. | Raw material | | After the extruder | |
| --- | --- | --- | --- | --- | --- |
| | | i.v. [dl/g] | acetaldehyde [ppm] | i.v. [dl/g] | acetaldehyde [ppm] |
| 1 | 200 | 0.803 | 2.6 | 0.771 | 2.3 |
| 2 | 3000 | 0.800 | 5.1 | 0.786 | 2.4 |
| 3 | 950 | 0.822 | 3.3 | 0.756 | 2.9 |

Table 1 shows that the contents of acetaldehyde in the raw material can vary to a wide extent. In all tests, the intrinsic viscosity (i.v.) lowered after extrusion as could be expected. However, the contents of acetaldehyde was also lowered, which illustrates a certain purification effect.

The thus extruded recycled material was then subjected to crystallization densation. The results are given in Table 2 below.

TABLE 2

| Example No. | Total quantity/product kgs. | After crystallization and SSP | |
| --- | --- | --- | --- |
| | | i.v. [dl/g] | acetaldehyde [ppm] |
| 1 | 200 | 0.869 | 0.46 |
| 2 | 3000 | 0.884 | 0.46 |
| 3 | 950 | 0.848 | 0.48 |

In comparison with Table 1, Table 2 shows that the intrinsic viscosity had remarkably increased, even in comparison with that of the raw material, while the contents of acetaldehyde was lowered to a neglectible amount after the treatment according to the invention.

EXAMPLE 4

In a further example, PET material to be recycled was treated in the manner described above using $N_2$ in the reactor 4' and a temperature of about 215° C. The time of treatment took 8 hours. The raw material and the reclaimed material at the end of the process were tested with respect to their contents of toluene, chlorobenzene, phenyl cyclohexane and benzophenone. All these contaminating substances were found to be almost removed at the end of the process, i.e., toluene with a purification efficiency of 99.4%, chlorobenzene with a purification efficiency of more than 99.9%, phenyl cyclohexane with 98.5% and benzophenone in an extent of 98.6%. This shows the high bottle grade quality obtained by the present invention.

What is claimed is:

1. A process for upgrading non-virgin plastic material to be reclaimed comprising the steps of continuously extruding said plastic material to provide elongated strands thereof;

continuously cutting said elongated strands as they are supplied by said extrusion step to convert them into pellets;

immediately feeding said pellets without intermediate storage;

continuously crystallizing said pellets, as they are fed in said feeding step from said cutting step, in a stream of hot gas of a desired temperature to heat the pellets to crystallizing temperature; and immediately feeding said pellets from a crystallizer following the continuous crystallizing, without intermediate storage, for solid state condensing said pellets under heat in a continuous flow after said crystallization step to reach a desired intrinsic viscosity.

2. The process as claimed in claim 1, wherein said crystallizing step is carried out in a continuous fluidized bed of predetermined characteristic of flow of said pellets, said predetermined characteristic being a plunger characteristic.

3. The process as claimed in claim 1, wherein at least one of the following characteristics is provided:

a) said crystallizing step is a one-step process;

b) the step of solid state condensing said pellets is effected without substantial change in intrinsic viscosity of said pellets in comparison with that of the material before extrusion;

c) said condensing step is carried out at a temperature lower than that of said hot gas;

d) said condensing step is carried out under a stream of gas, preferably in counter-direction to said continuous flow;

e) at least one of said steps of heating said pellets is carried out in an atmosphere of nitrogen;

f) both steps of heating said pellets are carried out in a gas atmosphere, said gas being fed from said condensing step to said crystallizing step;

g) said non-virgin plastic material comprises polyethylene terephthalate.

4. The process as claimed in claim 1, further comprising the step of decontaminating the material to be reclaimed from migrated or adhering substances, said step comprising sucking material off which is selected from volatiles and fines, wherein preferably the gas of at least one of said steps of heating said pellets is separated from any solid matter and is recycled.

5. The process as claimed in claim 1, further comprising the step of monitoring the quality of the material to be reclaimed to obtain a grading value and controlling said desired temperature of said gas or of said heat using said grading value to obtain a substantially uniform desired quality, said grading value comprising the intrinsic viscosity.

6. The process as claimed in claim 1, further comprising at least one of the following steps:

a) cooling said pellets after said condensing step;

b) admixing pellets of fresh plastic material not previously used to said non-virgin plastic material, comprising the step of solid state condensing said pellets in a continuous flow after said crystallization step; and the step of cooling said pellets after said condensing step;

said admixing step being carried out after said cooling step.

7. The process as claimed in claim 1, wherein, after continuously extruding said plastic material, the rheological properties of the plastic melt are measured and converted to an intrinsic viscosity.

8. The process as claimed in claim 7, wherein the conditions in the solid state condensing step are controlled according to the difference between the measured and the desired intrinsic viscosity.

9. The process as claimed in claim 1, wherein the temperature in the solid state condensing step is controlled and the residence time is held substantially constant.

10. The process as claimed in claim 1, wherein, during the extrusion step for continuously extruding said plastic material, a gas barrier enhancing additive is added.

11. The process as claimed in claim 10, wherein said gas barrier enhancing additive is at least one of a scavenging type additive and a gas permeation restricting type additive.

12. The process as claimed in claim 1, wherein the crystallization in said crystallizing step is carried out to a degree of crystallization of less than 50%.

13. The process as claimed in claim 1, wherein the crystallization in said crystallizing step is carried out to a degree of crystallization of less than 45%.

* * * * *